United States Patent
Latin-Stoermer et al.

(10) Patent No.: US 9,977,584 B2
(45) Date of Patent: May 22, 2018

(54) NAVIGATING MEDIA PLAYBACK USING SCROLLABLE TEXT

(71) Applicant: Amazon Technologies, Inc., Reno, NV (US)

(72) Inventors: Toby Ray Latin-Stoermer, Seattle, WA (US); Jonathan Beech, Seattle, WA (US); Hari Gangadharan, Seattle, WA (US); Gabriela Ahern, Seattle, WA (US); Brandon Scott Durham, Seattle, WA (US); Darren Levi Malek, Seattle, WA (US); Ralph Cameron Harvey, Seattle, WA (US); Benjamin Lee Shepherd, Seattle, WA (US); Jason Christopher Hall, Seattle, WA (US); Andrew Powell McGoogan, Seattle, WA (US); Robert Richard Morse, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 443 days.

(21) Appl. No.: 14/860,093

(22) Filed: Sep. 21, 2015

(65) Prior Publication Data
US 2016/0011761 A1    Jan. 14, 2016

Related U.S. Application Data

(63) Continuation of application No. 14/102,303, filed on Dec. 10, 2013, now Pat. No. 9,176,658.

(51) Int. Cl.
G06F 3/00       (2006.01)
G06F 3/0484     (2013.01)
(Continued)

(52) U.S. Cl.
CPC ........ G06F 3/04847 (2013.01); G06F 3/0485 (2013.01); G06F 3/04842 (2013.01);
(Continued)

(58) Field of Classification Search
CPC .................................................. G06F 3/04847
(Continued)

(56) References Cited

U.S. PATENT DOCUMENTS 8,433,431 B1 *  4/2013  Master ................. G10H 1/0008
                                                    700/94
8,601,372 B1 * 12/2013  Gentile ................ G06F 3/0484
                                                    715/202
(Continued)

OTHER PUBLICATIONS

U.S. Notice of Allowance dated Jul. 15, 2015 issued in U.S. Appl. No. 14/102,303.

*Primary Examiner* — William Titcomb
(74) *Attorney, Agent, or Firm* — Hogan Lovells US LLP

(57) ABSTRACT

A computing device can periodically acquire a current track time for a media content item being played. The device can periodically compare the current track time with a respective start time and a respective end time for each line (or segment) in a plurality of lines of text (or segments of text) associated with the media content item. If the device determines that the current track time is between start and end times for a given line of text, then the device can display the given line of text. A user of the device can scroll through the lines of text associated with the media content item. If the user selects a particular line of text, the device can identify a start time for the selected line of text. The device can then play the media content item at the identified start time of the selected line of text.

21 Claims, 15 Drawing Sheets

(51) Int. Cl.
*G06F 3/0485* (2013.01)
*G06F 3/16* (2006.01)
*G10H 1/36* (2006.01)

(52) U.S. Cl.
CPC ............ *G06F 3/165* (2013.01); *G10H 1/361* (2013.01); *G10H 2220/011* (2013.01); *G10H 2220/096* (2013.01); *G10H 2230/015* (2013.01)

(58) Field of Classification Search
USPC ....................................................... 715/716
See application file for complete search history.

(56) References Cited

U.S. PATENT DOCUMENTS

| | | | |
|---|---|---|---|
| 9,026,942 B2* | 5/2015 | Juristovski | G06F 17/30026 715/200 |
| 9,176,658 B1* | 11/2015 | Latin-Stoermer | G06F 3/0485 |
| 2005/0255914 A1* | 11/2005 | McHale | A63F 13/10 463/31 |
| 2006/0048632 A1* | 3/2006 | Morley | G10H 1/368 84/600 |
| 2009/0165634 A1* | 7/2009 | Mahowald | G10H 1/368 84/610 |
| 2009/0228544 A1* | 9/2009 | Demers | G06F 17/30058 709/201 |
| 2013/0091428 A1* | 4/2013 | Shirzadi | G06F 3/0488 715/716 |
| 2015/0120767 A1* | 4/2015 | Skeen | G06F 17/30752 707/754 |

* cited by examiner

250

| Start Time | Lines of Text for Media Content Item ("Twinkle, Twinkle, Little Star") | End Time |
|---|---|---|
| 0:15 | Twinkle, twinkle, little star, | 0:22 |
| 0:23 | How I wonder what you are. | 0:28 |
| 0:29 | Up above the world so high, | 0:34 |
| 0:35 | Like a diamond in the sky. | 0:40 |

| Start Time | Lines of Text for Media Content Item ("Twinkle, Twinkle, Little Star") | End Time |
|---|---|---|
| ⋮ | ⋮ | ⋮ |
| 2:38 | Till the sun is in the sky. | 2:43 |
| 2:44 | Twinkle, twinkle, little star, | 2:49 |
| 2:55 | How I wonder what you are. | 2:59 |
| 3:00 | ... | 3:15 |

NAVIGATING MEDIA PLAYBACK USING SCROLLABLE TEXT

RELATED APPLICATIONS

This application is a continuation of allowed U.S. application Ser. No. 14/102,303, entitled "NAVIGATING MEDIA PLAYBACK USING SCROLLABLE TEXT", filed Dec. 10, 2013; of which the full disclosure of this application is incorporated herein by reference for all purposes.

BACKGROUND

Computing devices are becoming more commonplace and are used for a wide variety of purposes. Every day, people use their computing devices to view, access, and/or interact with various types of content and information, especially as computing devices and applications are growing in number and in function. As an example, a user can use a computing device to access various types of media. The user can use the computing device to play music, movies, videos, audio books, audio broadcasts, and other content. In some cases, the user may want to scrub or otherwise navigate (e.g., fast forward, rewind) through a playback of the media. Conventional approaches typically enable the user to scrub or navigate through the media playback by moving a scrubbing element (e.g., slider, button, marker, pointer). Moreover, in some cases, text associated with the media can be presented in conjunction with the media playback. In one example, text in a subtitle file can be displayed while a movie is playing. However, conventional approaches to navigating media content and presenting text associated with the media content can be uninteresting and lacking in interactivity. This can negatively affect the overall user experience associated with using computing devices to access media content.

BRIEF DESCRIPTION OF THE DRAWINGS

Various embodiments in accordance with the present disclosure will be described with reference to the drawings, in which:

FIG. 2B illustrates example data that can be useful for implementing navigation of media playback using scrollable text;

FIG. 5B illustrates example data that can be useful for implementing navigation of media playback using scrollable text;

DETAILED DESCRIPTION

Figure 1:
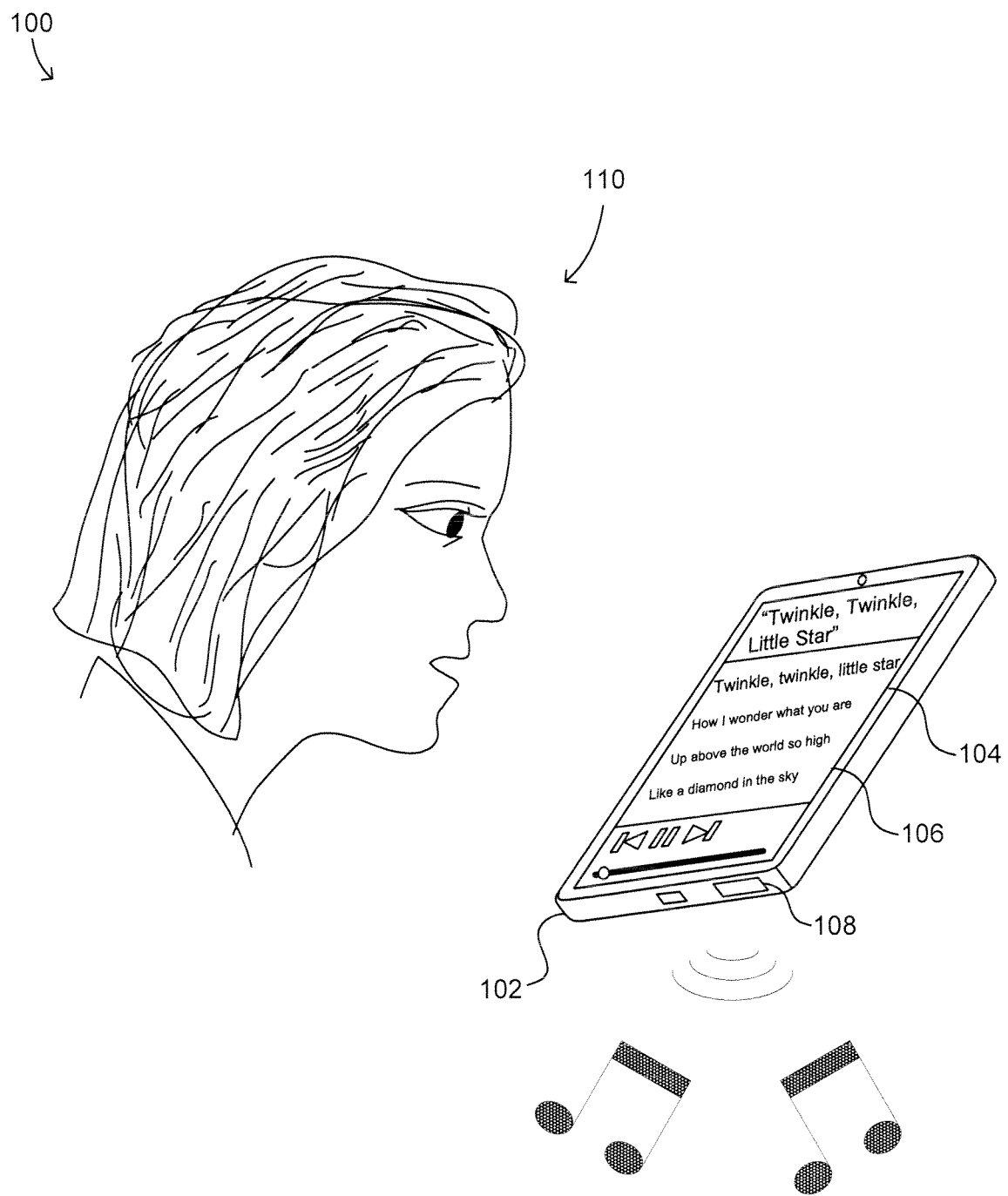
FIG. 1 illustrates an example environment in which aspects of the various embodiments can be utilized.

Systems and methods in accordance with various embodiments of the present disclosure overcome one or more of the above-referenced and other deficiencies in conventional approaches to presenting media content via a computing device. In particular, various embodiments of the present disclosure can output audio, display text that is synchronized to the audio, and navigate a playback of media content based, in part, on scrolling through and selecting the text.

At least some embodiments enable the computing device to receive data relating to text for a media content item. The media content item can include, for example, music, videos, audio broadcasts, etc. The text for the media content item can include, for example, lyrics associated with songs, subtitles associated with videos, annotations/comments associated with audio broadcasts, etc. In some instances, the media content item can be provided by a media service and the data relating to the text can be provided by a media text service. In some embodiments, the data relating to the text can include a plurality of segments of text (e.g., lines of text) associated with the media content item. Moreover, in some embodiments, each of the plurality of segments of text (e.g., lines of text) can have a respective start time with respect to the media content item and a respective end time with respect to the media content item. The start time for a given segment (e.g., line) of text can indicate or approximate the time, during the playback of the media content item, at which the given segment of text would begin to be uttered/sang/heard. It follows that the end time associated with the given segment of text indicates or approximates the time, during the playback of the media content item, at which the given segment of lyrics would cease to be uttered/sung/heard.

In some embodiments, a user of a computing device can acquire a media content item. For example, the media content item can be acquired from a media service. The media service can also provide text data that is associated with the media content item. In this example, the text data can include a plurality of segments of text associated with the media content item and respective start and end times for each segment of text. The computing device can play or run the media content item. In some embodiments, the device can periodically acquire the current track time for the media content item being played. The device can compare the current track time with the respective start and end times for each segment of text. If the device determines that the current track time is between start and end times for a particular segment of text, then the device can display the particular segment of text. This process continues such that a current segment of text is displayed corresponding to the current track time of the media content item. In other words, the device can display the current segment of text that corresponds to a current portion of the media content item being played.

Various embodiments enable the user to scroll or otherwise navigate through the plurality of segments of text associated with the media content item. If the user selects a particular segment of text (i.e., a target segment of text), the computing device can identify a start time for the selected segment of text. The device can cause the media content item to play at the identified start time of the selected segment of text. As such, the user can scroll through the segment of text and navigate the playback of the media content item by selecting a segment of text.

Other variations, applications, and functions are described and suggested below as may be provided in accordance with the various embodiments.

FIG. 1 illustrates an example environment 100 in which aspects of the various embodiments can be utilized. The example environment 100 can include a computing device 102. The computing device 102 can comprise a display element 104, such as a display screen. The computing device 102 can also comprise a touch sensor 106. In some embodiments, the display element 104 can work in conjunction with the touch sensor 106. As such, the display element 104 and touch sensor 106 can correspond to a touch display (i.e., touch screen). The touch display can be configured to detect one or more touch inputs and/or touch gestures performed by a user 110 of the computing device 102.

Moreover, the computing device 102 can comprise one or more audio output elements 108. In one example, the one or more audio output elements 108 can include one or more speakers, earphones, and/or audio ports (e.g., 3.5 mm jack), etc. The audio output element 108 can be utilized, at least in part, to provide audio, such as vocal communications during a phone call, music, audio tracks for videos, and/or audio broadcasts (e.g., from audio books or podcasts), etc.

As shown in the example environment 100 of FIG. 1, the computing device 102 can be used to play media content, such as a song, video, or other audio broadcast. For example, the audio output element 108 can be used to play the song, such that the song is audible to the user 110 of the computing device 102.

Various embodiments of the present disclosure can enable text associated with a media content item to be displayed (e.g., via the display element 104 or touch display) when the media content item is being played (e.g., via the audio output element 108). In some embodiments, text associated with the media content item can include (but is not limited to) lyrics, subtitles, annotations, and/or captions, etc. In some embodiments, the media content item can include (but is not limited to) a song, a video, and/or an audio broadcast, etc. In at least some embodiments, the text can be displayed while the media content item is played (e.g., outputted, run, etc.).

In the example of FIG. 1, the media content item can be the song "Twinkle, Twinkle, Little Star" and the text associated with the media content item can be lyrics for the song. As shown in FIG. 1, at least a portion of the lyrics can be displayed while the song is played. Furthermore, various embodiments of the present disclosure can enable the text (e.g., lyrics) to be synchronized to the playback of the media content item (e.g., song). As a result, the computing device 102 can play a portion of the media content item and simultaneously display a portion of the text corresponding to the portion of the media content item. For example, the device 102 can play a song and simultaneously (i.e., at or near the same time) display a line (or segment) of lyrics that corresponds to a current portion of the song being played. As the playback of the song progresses, the device 102 can scroll up the lines of lyrics (or segments of lyrics), such that the appropriate line of lyrics (or segment of lyrics) is displayed while the corresponding portion of the song is being played.

Furthermore, various embodiments enable the user 110 of the device 102 to scroll or otherwise navigate through the lines of lyrics for the song being played. For example, the user 110 can use a finger to swipe, drag, flick, etc., with respect to the lyrics displayed on the touch display of the device 102 or select a text navigational icon or menu option. The swipe, drag, flick, selection, etc., can be detected by the touch display and be identified as a command/instruction to scroll or navigate through the lyrics. Moreover, the user 110 can also select (e.g., tap on) a particular lyrics line (i.e., target line) and cause the song to play at a portion corresponding to the selected particular line. As such, the user 110 can navigate the song using scrollable text. In some embodiments, if the user 110 does not select a line (e.g., target line) within a specified time period (e.g., 5 seconds) from the scrolling (or from the last received touch input), then the device 102 will continue to play the song as expected and display the line of the lyrics that corresponds to the current portion of the song being played.

In some embodiments, a line (or segment) of text (e.g., lyrics) can include a portion of the entire text (e.g., lyrics for an entire song), such as one or more words, characters, or phrases included in the text. In some cases, a line (or segment) can comprises a number of characters less than or not exceeding a specified threshold. For example, each line can be set to have less than X amount of characters. Further, in some instances, different lines can be separated based, at least in part, on punctuation (e.g., periods, commas, etc.) and/or breaks (e.g., pauses in the media playback, end of a verses/section, etc.).

Figure 2A:
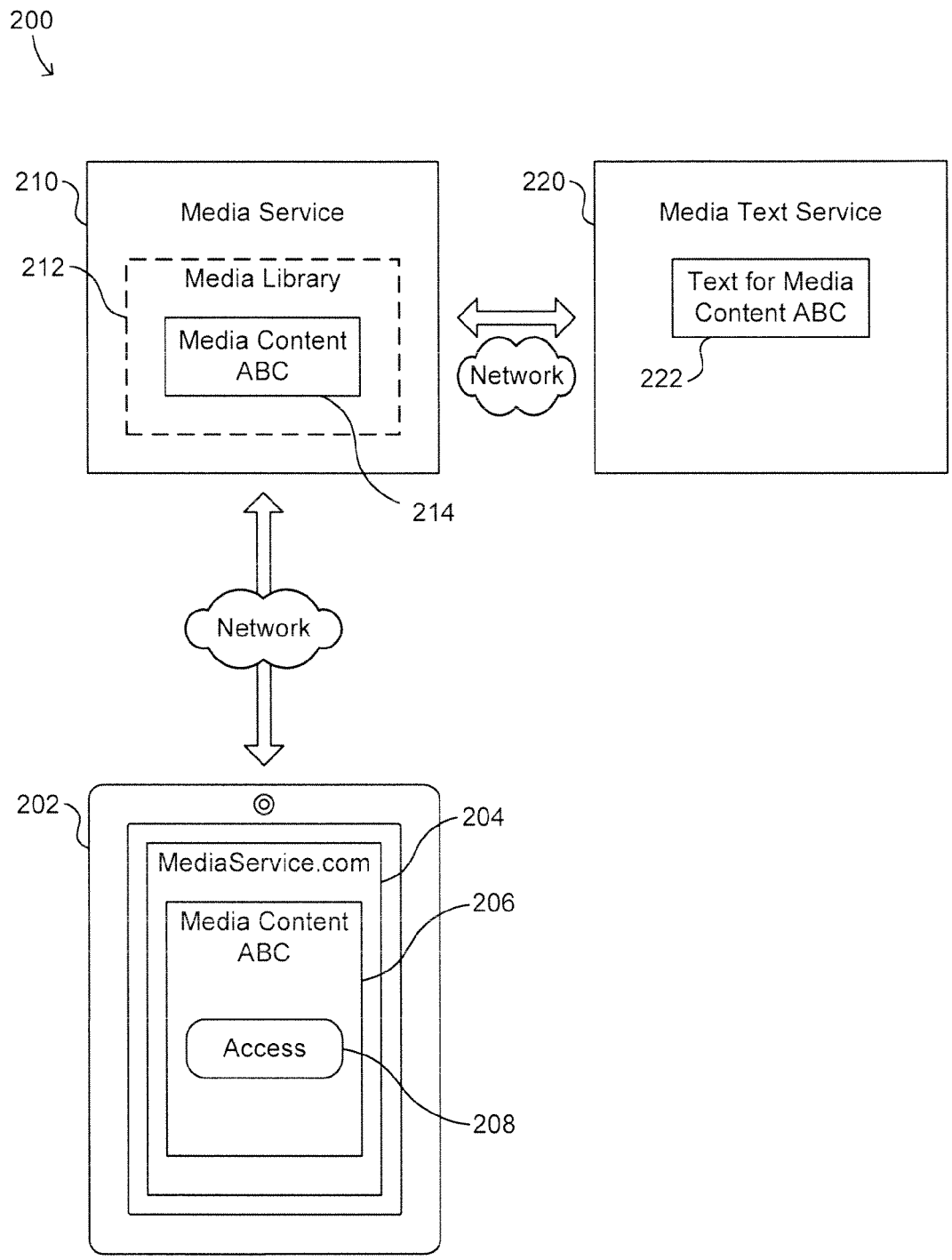
FIG. 2A illustrates an example system embodiment capable of providing for navigation of media playback using scrollable text.

Turning now to FIG. 2A, an example system embodiment 200 capable of providing for navigation of media playback using scrollable text is provided. The example system embodiment 200 can comprise a computing device 202, a media service 210, and a media text service 220. In the example of FIG. 2A, the computing device 202 can utilize a web browser, application, and/or other interface (e.g., element 204) to access the media service 210, such as via one or more networks (e.g., Internet). A user of the computing device 202 can identify a media content item 206 in which he or she is interested, such as Media Content ABC. The media content item 206 (e.g., Media Content ABC) can be accessed 208, such as by downloading from the media service 210 to the computing device 202 to be stored locally on the device 202. Additionally or alternatively, in some embodiments, the media content item 206 can be accessed 208 via network streaming from the media service 210, such that the media content item 206 can be played on the device 202 without having to download and store the content item 206 locally on the device 202.

Continuing with FIG. 2A, in some embodiments, the media service 210 can correspond to an online service that provides access to media content, such as music, videos, e-books, audio broadcasts, etc. In one example, the media service 210 can be associated with an online electronic marketplace that provides media content. Moreover, in some embodiments, the media service 210 can comprise one or more media libraries or databases 212. It is important to note that although shown as being included with the media service 210, in some embodiments, the one or more media libraries 212 can be separate from the media service 210. In other words, in some cases, the one or more media libraries 212 can reside on one or more servers external to one or more servers on which the media service 210 resides. Continuing with the example of FIG. 2A, the one or more media libraries 212 can store, in part, data 214 representative of Media Content ABC. The data 214 representative of Media Content ABC can be accessible 208 (e.g., downloading, streaming, etc.) to the computing device 202. The computing device 202 can acquire (e.g., download, stream, etc.) the data 214 from the media service 210 and, as a result, play Media Content ABC.

In addition, the example system embodiment 200 can include a media text service 220. In some embodiments, the media text service 220 can be an online service that provides text associated with media content. Examples of texts associated with media content can include (but is not limited to) lyrics for songs, subtitles or captions for audiovisual content, written prose for audiobooks, and/or annotations/captions for audio broadcasts/recordings, etc. In some instances, the text service 220 can provide rights for the media service 210 to use the text associated with media content items. In some instances, the text service 220 can also provide data representative of the text associated with media content items. As shown in FIG. 2A, the text service 220 can provide the media service 210 with access to the text 222 associated with Media Content ABC, which can include rights to utilize the text as well as the data representing the text.

FIG. 2B illustrates example data 250 which can be useful for implementing navigation of media playback using scrollable text. In the example of FIG. 2B, the example data 250 can correspond to information related to text for a media content item, such as lyrics for the song "Twinkle, Twinkle, Little Star." For example, the data 250 can be provided by the text service (e.g., 220 in FIG. 2A) to the media service (e.g., 210 in FIG. 2A). In some embodiments, the text service can analyze the song lyrics and appropriately separate the lyrics into multiple lines (or segments). In some embodiments, the text service can associate lyrics with corresponding audio word by word. As shown in FIG. 2B, the example data 250 can include a plurality of lines 252 of lyrics for the song "Twinkle, Twinkle, Little Star." Moreover, in some embodiments, the text service can identify a respective start time 254 and a respective end time 256 for each line of lyrics, as illustrated in FIG. 2B. The start time 254 associated with a particular line of lyrics attempts to indicate the time, during the playback of the song, at which the particular line of lyrics would begin to be sang/heard. It follows that the end time 256 associated with the particular line of lyrics attempts to indicate the time, during the playback of the song, at which the particular line of lyrics would cease to be sung/heard. Further, in some embodiments, the respective start time 254 and respective end time 256 for each line of lyrics can be identified or modified by the media service. Although, the start and end times for each line of the example media content is expressed in seconds in FIG. 2B, it will be appreciated that media content can be formatted according to different increments of time in various embodiments, such as by hour, deciseconds (tenths of seconds), centiseconds (hundredths of seconds), milliseconds, among others. In certain situations, there may be gaps between the spoken/sung words and audio of the media content. For example, a song may incorporate an extended guitar solo or a movie may include a pure action sequence. In various embodiments, the media content can be formatted to reflect such gaps between the spoken/sung words and audio.

Figure 3A:
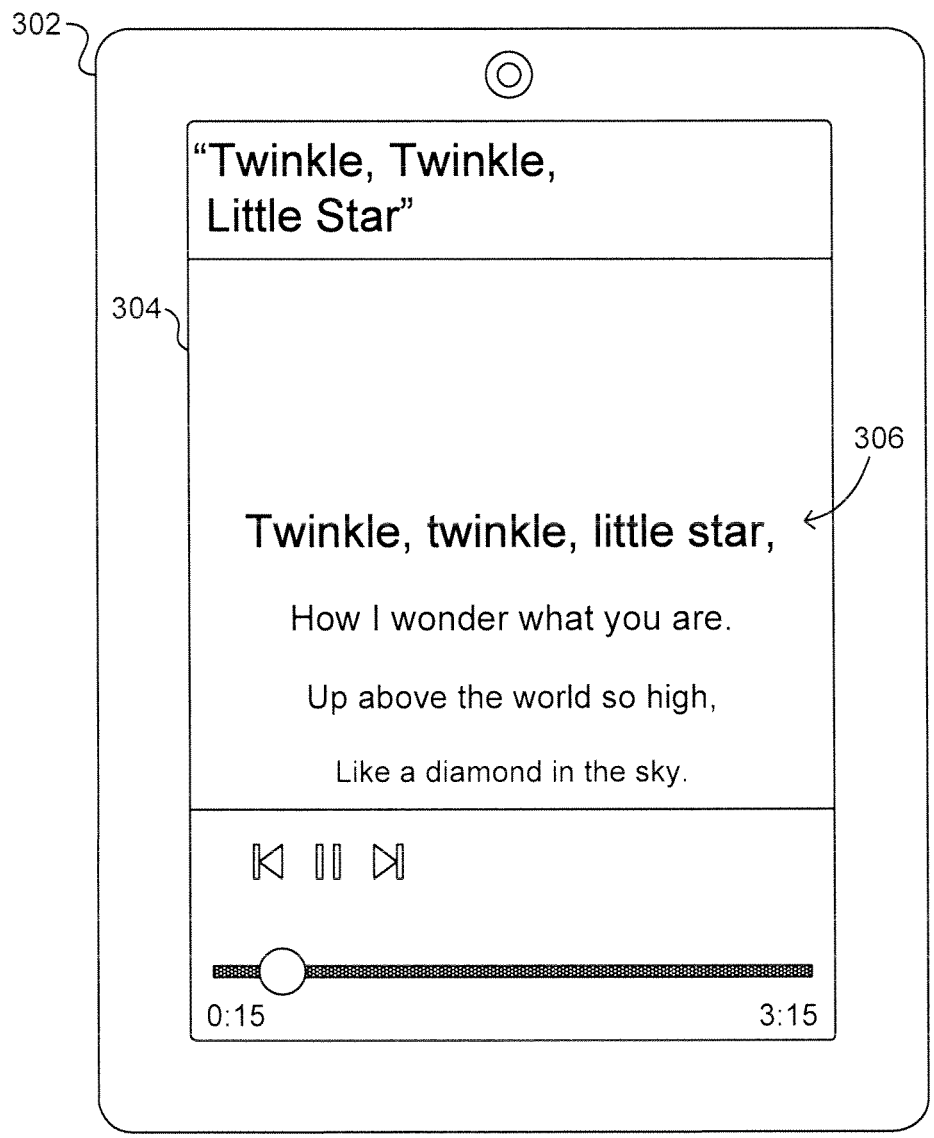
FIG. 3A illustrates an example device embodiment for navigating media playback using scrollable text.
Figure 3B:
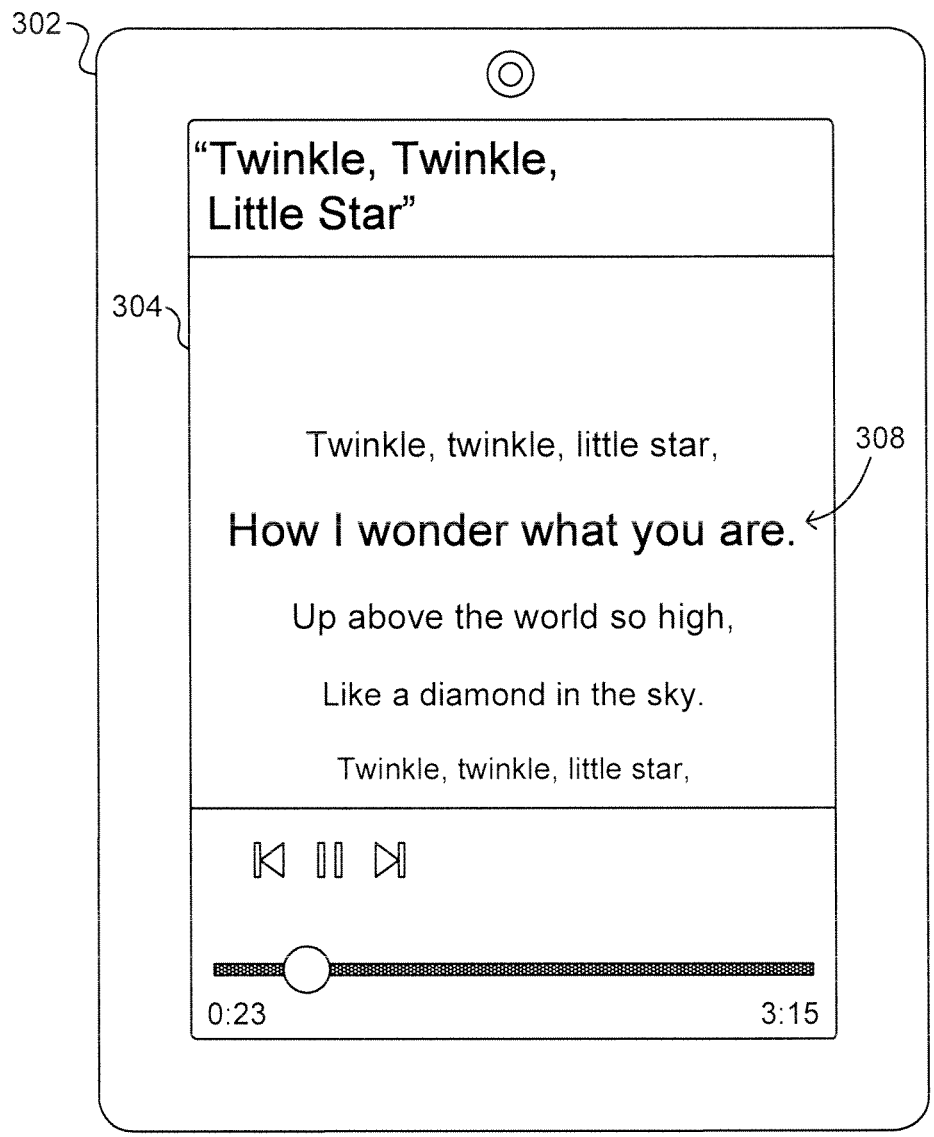
FIG. 3B illustrates an example device embodiment for navigating media playback using scrollable text.
Figure 3C:
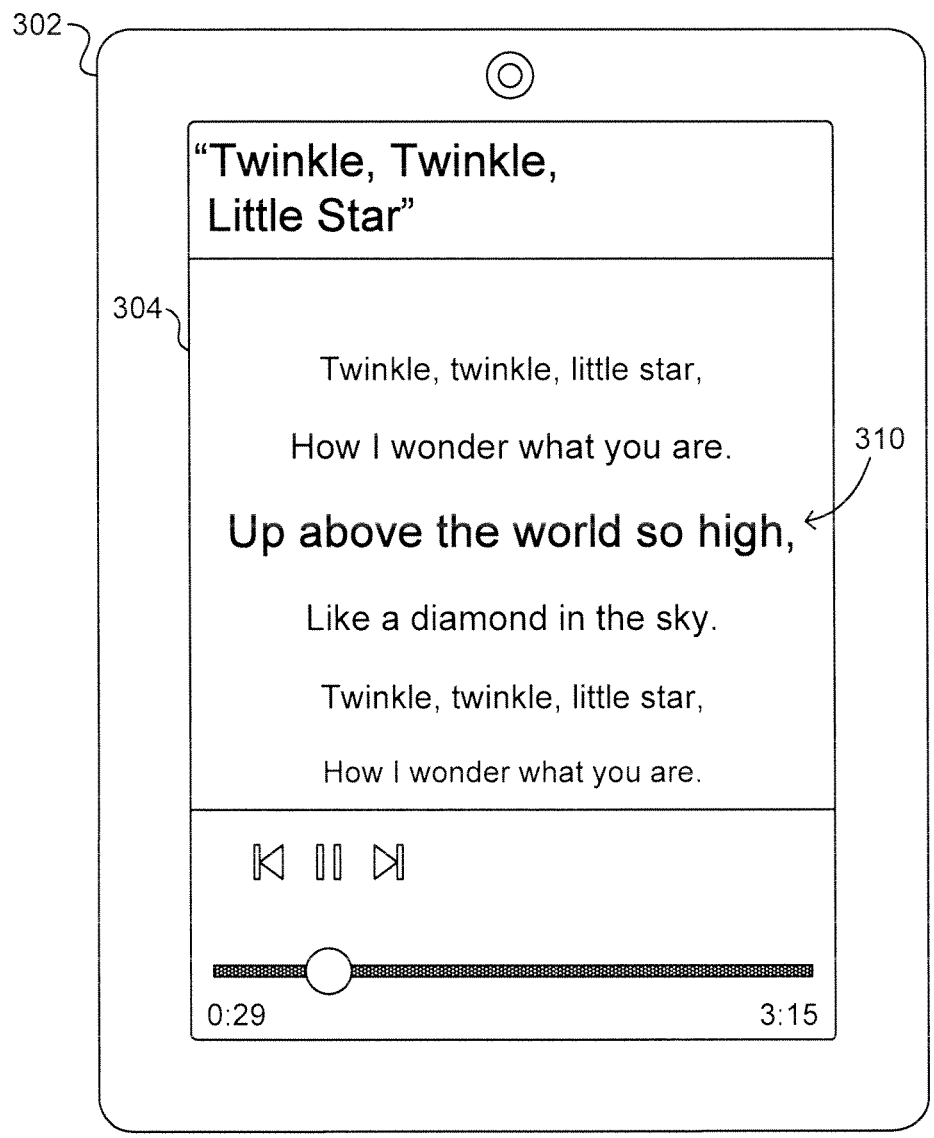
FIG. 3C illustrates an example device embodiment for navigating media playback using scrollable text.

With reference now to FIG. 3A, FIG. 3B, and FIG. 3C, an example computing device embodiment 302 for navigating media playback using scrollable text is illustrated. In the example of FIG. 3A, the computing device embodiment 302 has acquired a media content item (e.g., the song "Twinkle, Twinkle, Little Star") and data related to text for the media content item (e.g., lyrical data for "Twinkle, Twinkle, Little Star"). The computing device 302 can begin to play the song "Twinkle, Twinkle, Little Star." As the song is playing, the device 302 can acquire information about the current track time associated with the playback of the song. In some cases, the information about the current track time can be acquired over time (e.g., periodically). Further, the device 302 can check (e.g., over time, periodically) whether the current track time is between the start and end times of a particular line (or segment) of lyrics. In this example, assuming that the first line of lyrics 306 for the song has a start time of 0:15 and an end time of 0:22 (see, e.g., FIG. 2B), then when the current track time for the song playback reaches 0:15, the device 302 can display, at least in part, the first line of lyrics 306 via the device's display 304 (e.g., touch display/screen).

In the example of FIG. 3A, the first line of lyrics 306 can be known as the current line of lyrics when the playback track time is between 0:15 and 0:22. In other words, a current line of text for a media content item can be the text line that has a start time at or before the current track time (e.g., the track time of the current media playback) and has an end time at or after the current track time.

In addition, in some embodiments, the computing device can display one or more neighboring lines of text (e.g., lines of lyrics) when a current line is being displayed. The neighboring lines of text can correspond to one or more lines of text previous to the current line and/or after the current line. Furthermore, in some instances, the current line corresponding to the audio being output by the computing device can be visually emphasized. For example, the current line can be displayed in a color (e.g., highlight), font, font size (e.g., increase, decrease), format (e.g., bold, italicize, underline), etc., that is distinguishable from the displayed neighboring lines. In some embodiments, individual words corresponding to the audio being output by the computing device can additionally or alternatively be visually emphasized, such as via a bouncing ball that moves from to word to word as the word is spoken/sung or other word-by-word visual emphasis (e.g., color/highlight, font, font size, text style, etc.)

Continuing with the previous example involving the song "Twinkle, Twinkle, Little Star," the current track time of the song will eventually surpass the end time (0:22) of the first line 306. Thus, as shown in FIG. 3B, when the current track time reaches 0:23, the computing device 302 can determine that the current track time (0:23) now corresponds to the second line of lyrics 308, which has a start end of 0:23 and an end time of 0:28 (see, e.g., FIG. 2B). Accordingly, the device 302 can scroll up the lines of lyrics and display (and visually emphasize) the second line of lyrics 308.

Similarly, as the current track time of the song passes the end time (0:28) of the second line 308, then the device 302 can determine that the current track time is between the start and end times of the third line of lyrics 310, as shown in FIG. 3C. It follows that the device 302 can continue to scroll up the lyrics lines to display (and visually emphasize) the third line of lyrics 310. The scrolling of lyrics lines and the displaying of the current line can continue until the playback for the song ends.

Figure 4A:
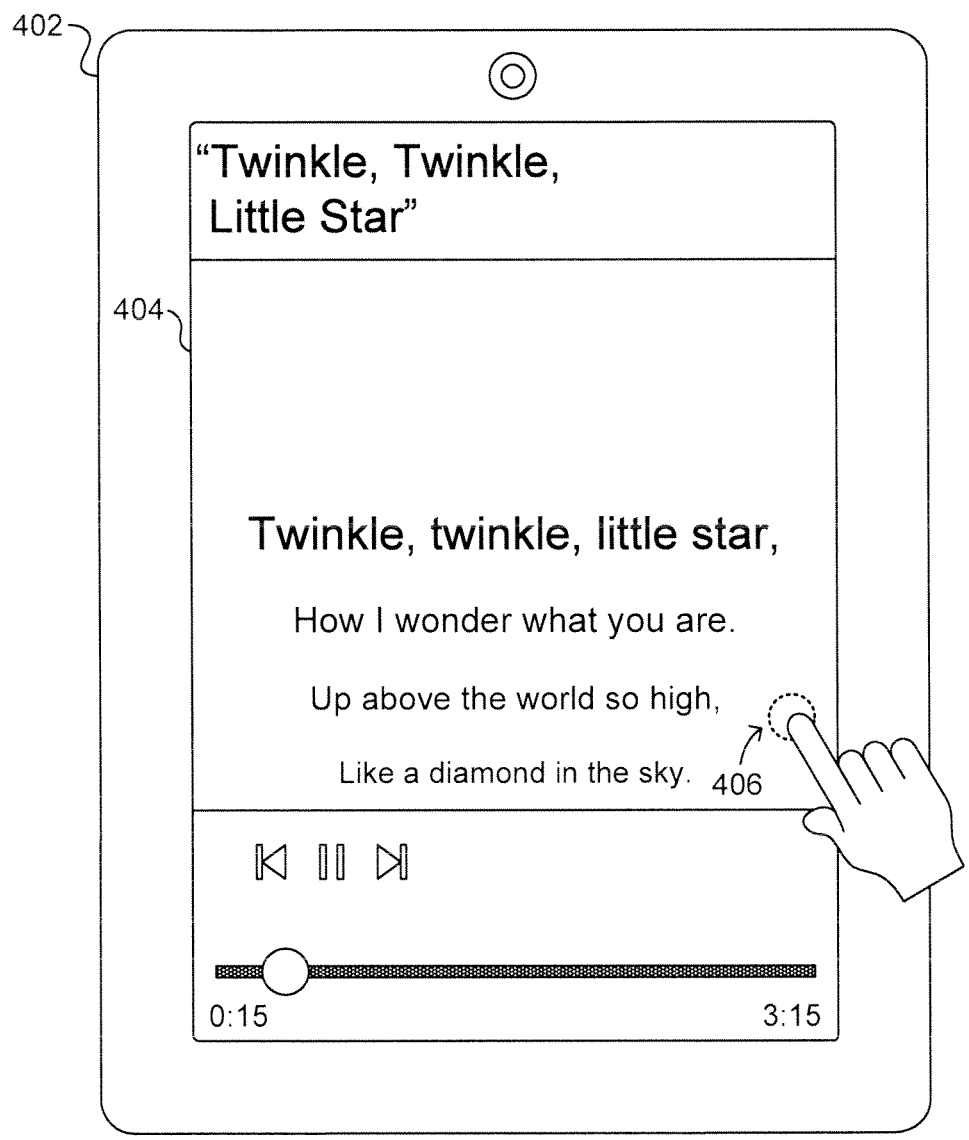
FIG. 4A illustrates an example device embodiment for navigating media playback using scrollable text.
Figure 4B:
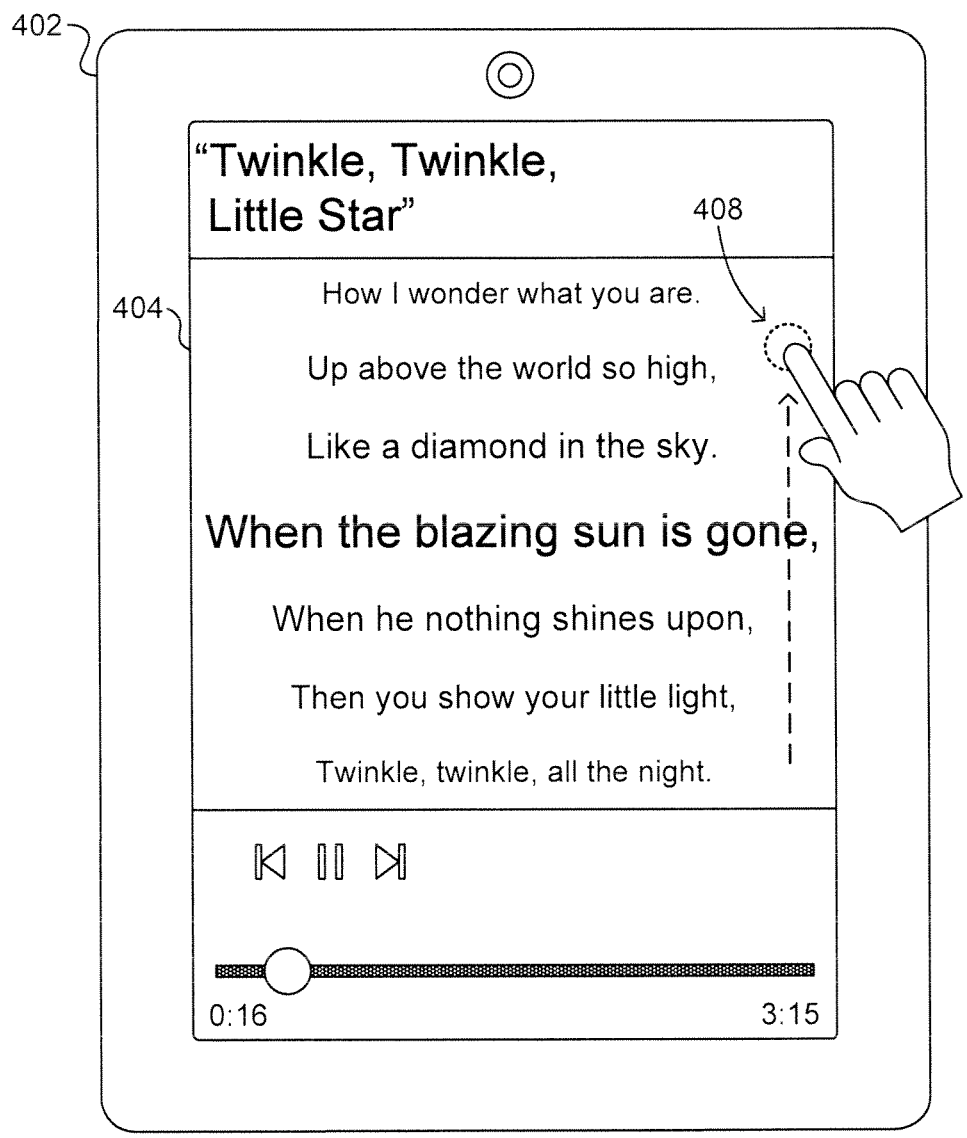
FIG. 4B illustrates an example device embodiment for navigating media playback using scrollable text.
Figure 4C:
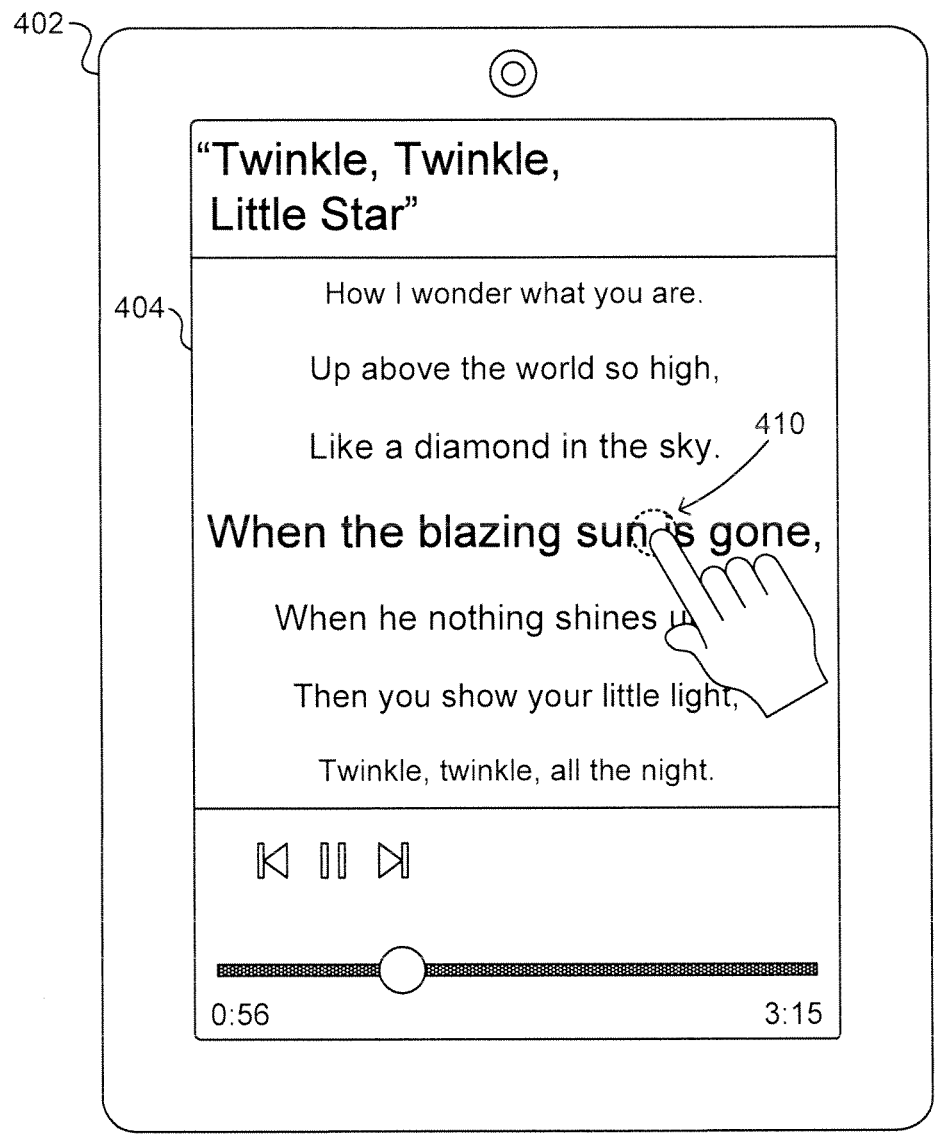
FIG. 4C illustrates an example device embodiment for navigating media playback using scrollable text.

Turning now to FIG. 4A, FIG. 4B, and FIG. 4C, an example computing device embodiment 402 for navigating media playback using scrollable text is illustrated. The computing device 402 can comprise a display element 404, such as a touch display/screen. In the example of FIG. 4A, the device 402 is playing a current portion of the song "Twinkle, Twinkle, Little Star" and displaying the current line (or segment) of lyrics corresponding to the current portion. In this example, the touch display 404 of the device 402 can detect a touch 406. The touch can serve as the beginning of a swipe, drag, flick, selection, etc., (e.g., movement 408), as illustrated in FIG. 4B. The touch display 404 can identify the movement 408 as being an upward swiping touch gesture. The device 402 can recognize the upward swiping touch gesture as a scrolling command/ instruction and, as a result, scroll up the displayed lines of lyrics based on the gesture, as shown in FIG. 4B. In at least some embodiments, the scrolling or otherwise navigating of the lines of lyrics does not affect the playing of the song. In other words, a user can scroll or navigate through the lines of lyrics while the song continues to play.

Continuing with the example, if the user selects a particular line or word of lyrics (can be referred to as targeted lyrics), then the device 402 can cause the playback of the song to skip to (e.g., jump to) and play the portion of the song that corresponds to the selected lyrics. In other words, when the user selects a target line or word, the device 402 can identify the start time of the target line or word and change the current track time of the playback to be the start time of the target line or word. In some embodiments, the user can select targeted lyrics by tapping, touching, and/or otherwise interacting with the targeted lyrics. As shown in the example of FIG. 4C, the user can tap 410 on the line "When the blazing sun is gone," or the word "sun's" in order to select the respective line or word. When the line or word is selected, the device 402 can cause the song to (skip to and) play the portion that corresponds to the selected (target) line or word.

However, in some instances, if a line or word of lyrics (e.g., targeted lyrics) is not selected within an allowable/ specified period of time (e.g., 5 seconds), then the playback of the song is not affected by the scrolling and the device 402 can display the current line or word corresponding to the current portion of the song being played. In other words, if the device 102 receives a scroll command or other touch input, but does not receive a subsequent selection of a target line within the allowable/specified time period, then the playback of the song is unaffected and the device 402 can display the current line that corresponds to the current song portion being played.

Figure 5A:
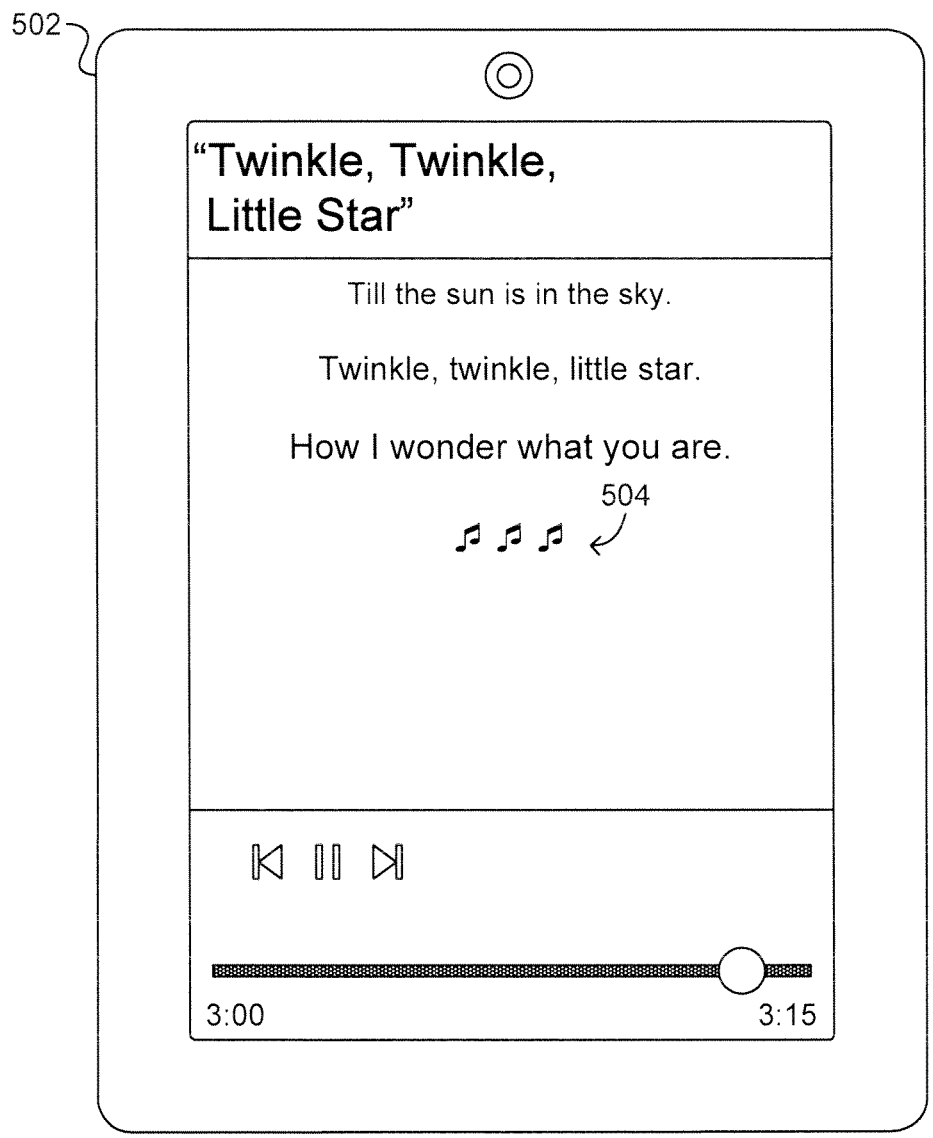
FIG. 5A illustrates an example device embodiment for navigating media playback using scrollable text.

FIG. 5A illustrates an example device embodiment 502 for navigating media playback using scrollable text. In some embodiments, the example computing device embodiment 502 can be playing a portion of a media content item that is not transcribable into text. The computing device 502 can determine and/or confirm that a playback time duration for the portion of the media content item at least meets or exceeds a specified time period threshold (e.g., 5 seconds). Then the device 502 can display a special element 504, such as ellipses or other graphical content, indicating that the portion of the media content item is not transcribable into text. In one example, the computing device 502 can be playing a portion of a song that is music-only (e.g., no words being sung). The device 502 can determine that the music-only portion lasts for 15 seconds (e.g., 3:00 to 3:15). The device 502 can then display ellipses or other graphical content 504 to indicate that the corresponding portion of the song being played is music-only.

FIG. 5B illustrates example data 550 that can be useful for implementing navigation of media playback using scrollable text. In some embodiments, portions of a media content item that are not transcribable into text can be included and/or represented in the data 550 relating to the text for the media content item. As shown in the example of FIG. 5B, there can be a data entry 552 for a music-only portion of the song "Twinkle, Twinkle, Little Star," the music-only portion having a start end of 3:00 and an end time of 3:15. As such, the computing device can analyze the data 550 to recognize which portions are not transcribable and when to display the special element (e.g., an ellipse, "Music Only", etc.).

Figure 6A:
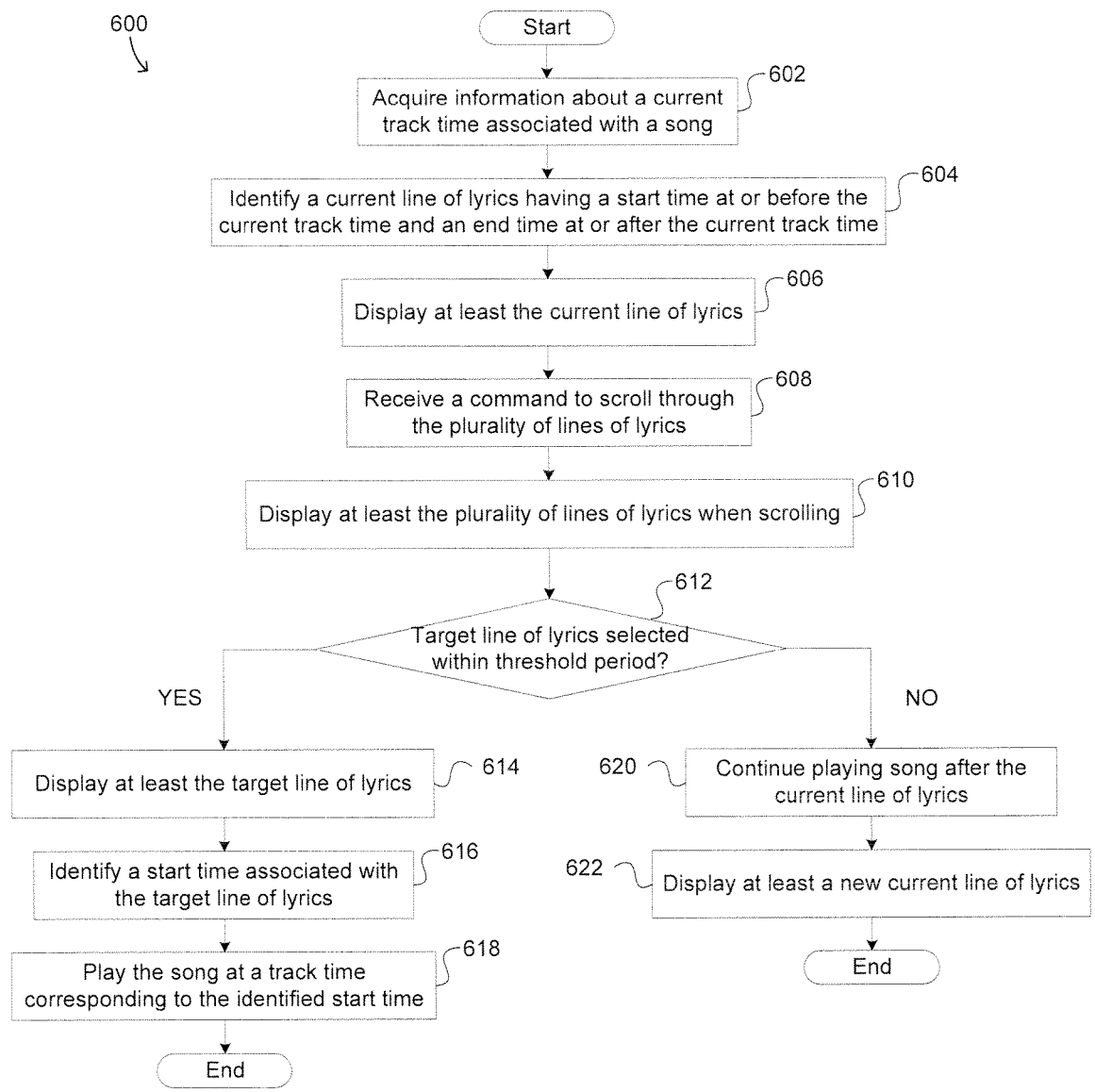
FIG. 6A illustrates an example method embodiment for navigating media playback using scrollable text.

FIG. 6A illustrates an example method embodiment for navigating media playback using scrollable text. It should be understood that there can be additional, fewer, or alternative steps performed in similar or alternative orders, or in parallel, within the scope of the various embodiments unless otherwise stated. At step 602, the example method embodiment 600 can acquire information about a current track time associated with a song being played. Step 604 can include identifying a current line (or segment) of lyrics out of a plurality of lines (or segments) of lyrics associated with the song. The identified current line of lyrics can have a start time at or before the current track time and an end time at or after the current track time. Step 606 can include displaying at least the current line of lyrics.

At step 608, the method 600 can receive a command to scroll through at least a subset of the plurality of lines of lyrics. The method 600 can then display at least the subset of the plurality of lines of lyrics when scrolling, at step 610. At step 612, a determination can be made whether a target line of lyrics has been selected within an allowable/specified period (e.g., 5 seconds). If a target line of lyrics has been selected within the allowable/specified period, then at least the target line of lyrics can be displayed at step 614.

Step 616 can include identifying a start time associated with the target line of lyrics when the selection for the target line of lyrics is received. Then step 618 can include playing the song at a track time corresponding to the identified start time associated with the target line of lyrics. If at step 612 no target line of lyrics has been selected within the allowable/specified time period, then the track can continue being played following the current line of lyrics 620, and at least a new current line of lyrics can be displayed 622.

Figure 6B:
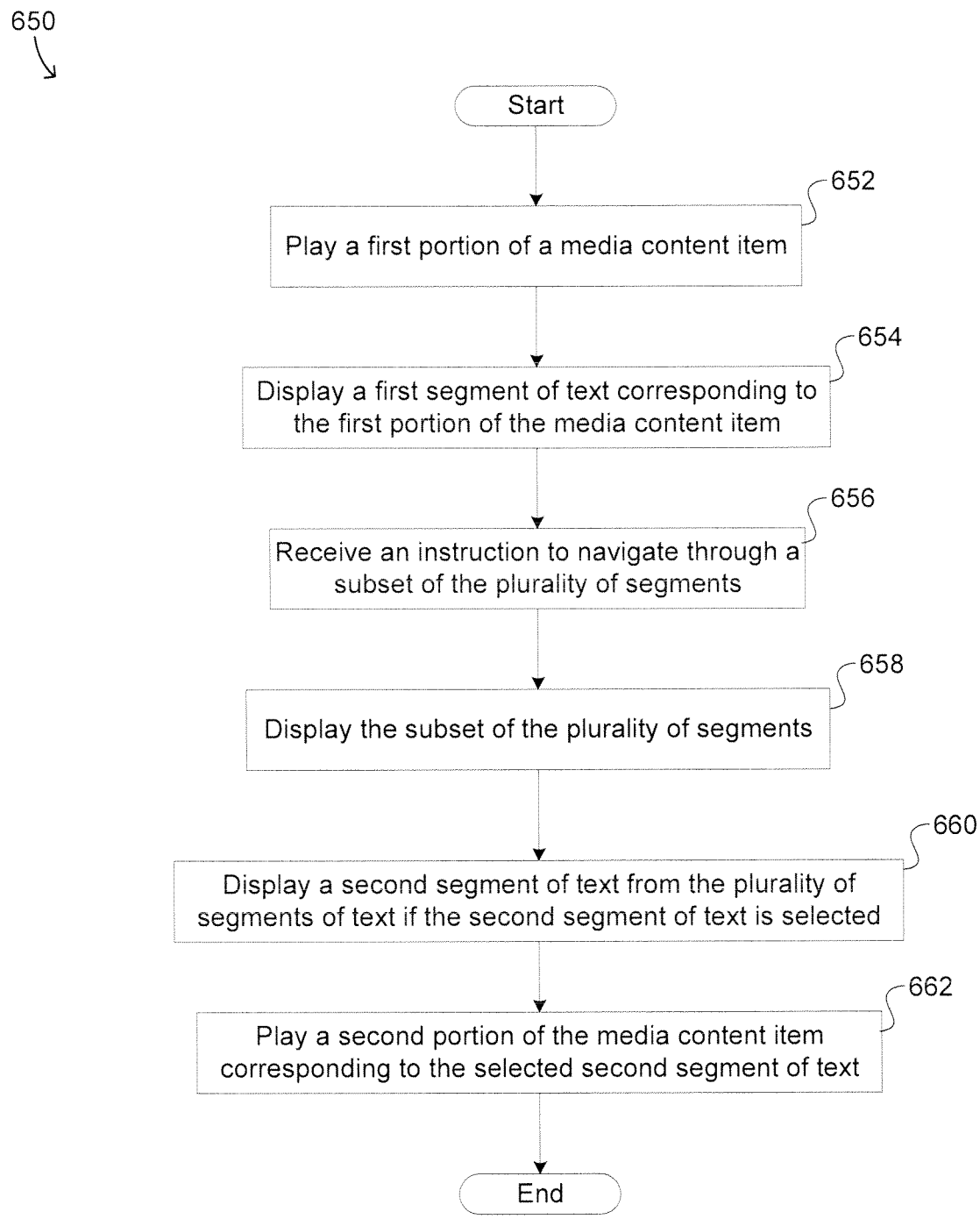
FIG. 6B illustrates an example method embodiment for navigating media playback using scrollable text.

FIG. 6B illustrates an example method embodiment for navigating media playback using scrollable text. Again, it should be understood that there can be additional, fewer, or alternative steps performed in similar or alternative orders, or in parallel, within the scope of the various embodiments unless otherwise stated. The example method embodiment 650 can play at least a first portion of a media content item, at step 652. The method 650 can display at least a first line (or segment) of text from a plurality of lines (or segments) of text associated with the media content item, at step 654. The first line of text can correspond to the first portion of the media content item being played.

At step 656, the method can receive an instruction to navigate through at least a subset of the plurality of lines of text associated with the media content item. Step 658 can include displaying at least the subset of the plurality of lines. Step 660 can include displaying at least a second line of text from the plurality of lines of text if the second line of text is selected. The second line of text can correspond to a second portion of the media content item. Then the method 650 can play at least the second portion of the media content item corresponding to the selected second line of text, at step 662.

In some embodiments, the first line of text can be determined to be corresponding to the first portion of the media content item, the determination being made prior to the first line of text being displayed. In some embodiments, the second line of text can be determined to correspond to the second portion of the media content item, the determination being made prior to the second portion of the media content item being played.

Moreover, in some embodiments, determining that the first line of text corresponds to the first portion of the media content item further comprises identifying a first track time associated with the first portion and determining that the first line of text is associated with a start time at or before the first track time and with an end time at or after the first track time. In some embodiments, determining that the second line of text corresponds to the second portion of the media content item further comprises identifying a second track time associated with the second portion and determining that the second line of text is associated with a start time at or before the second track time and with an end time at or after the second track time.

It is further contemplated that there can be many other uses and/or applications associated with the various embodiments of the present disclosure that a person having ordinary skill in the art would recognize.

Figure 7:
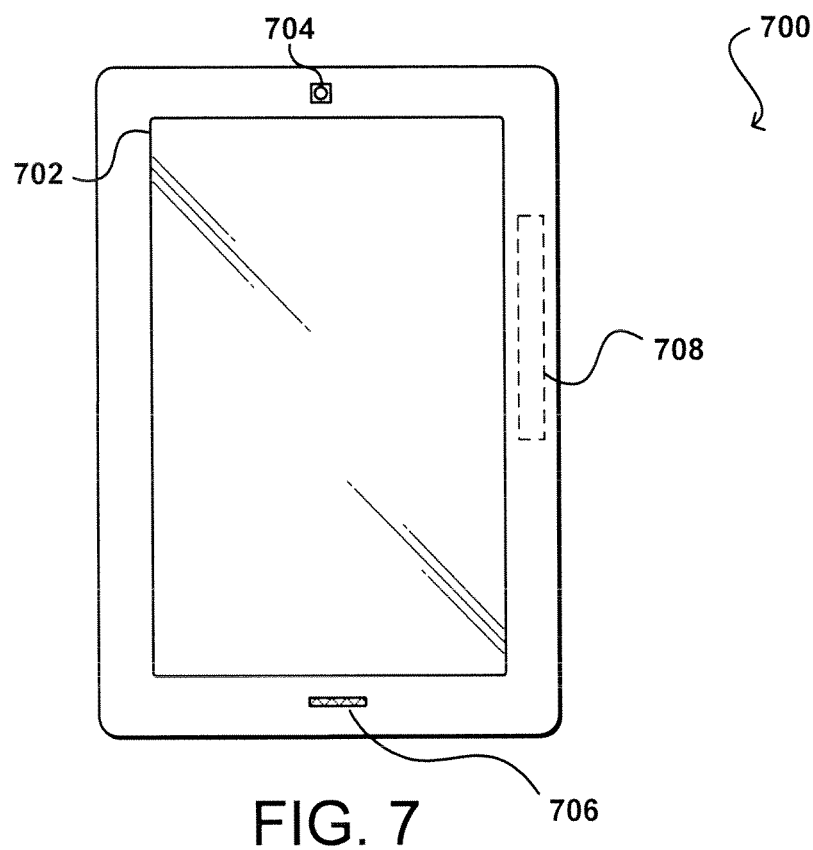
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
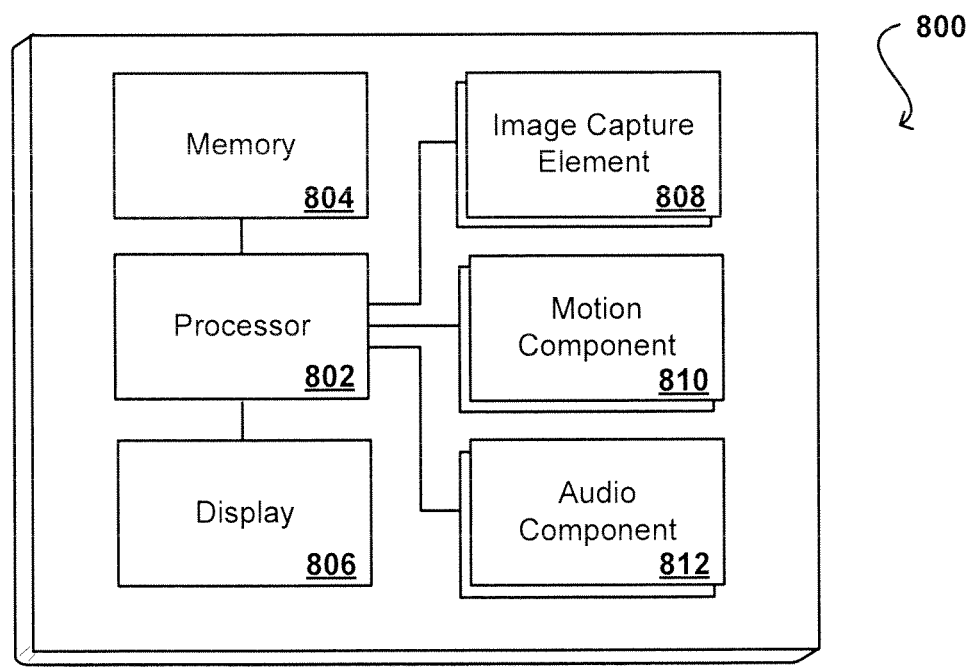
FIG. 8 illustrates example components of a device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
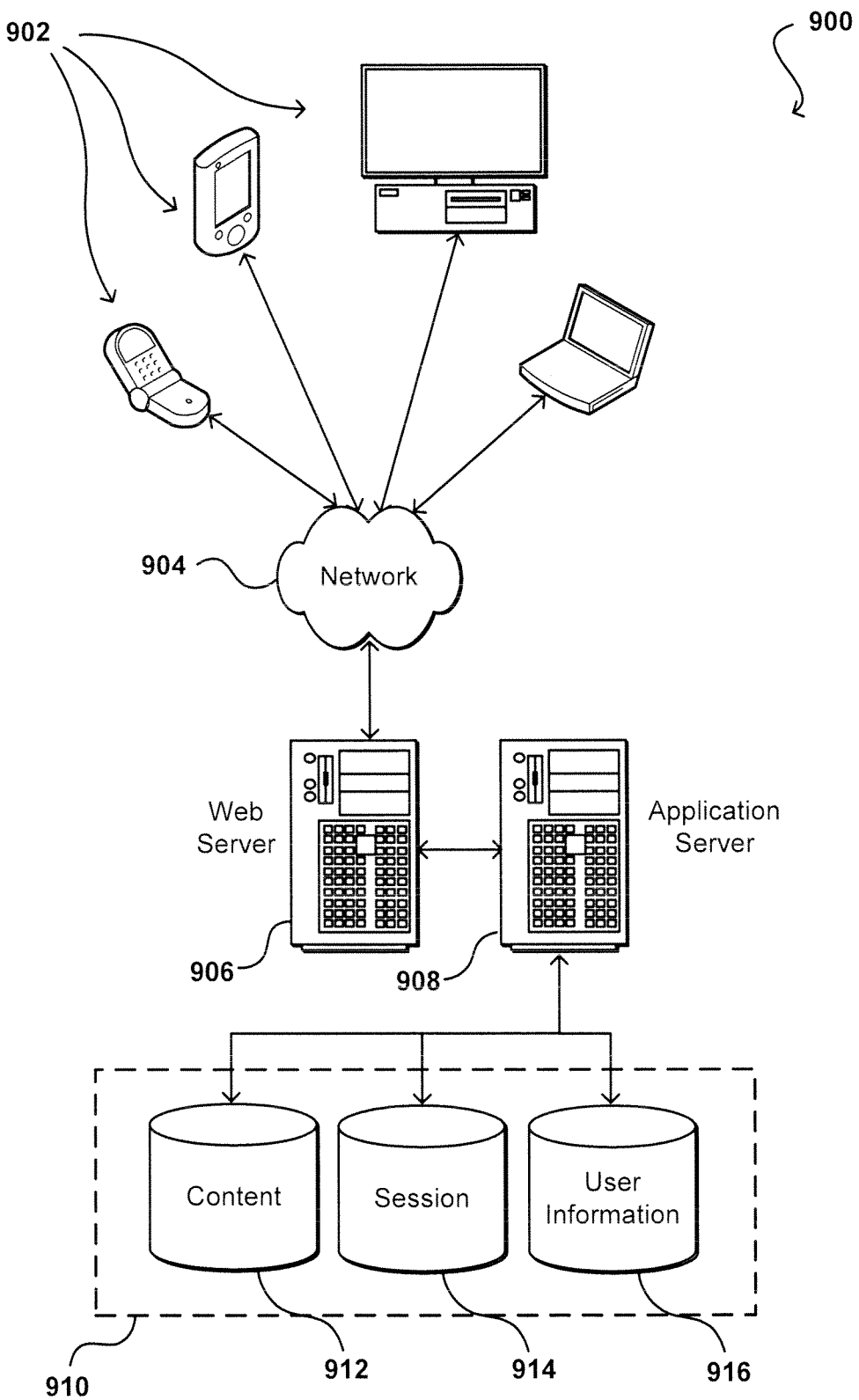
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device comprising:
   at least one processor;
   at least one memory device including instructions that, when executed by the at least one processor, cause the computing device to:
   display a first plurality of segments associated with a media content item, each of the segments having a successive respective start time and end time bounded by a start time and an end time associated with the media content item;
   receive an instruction to navigate through the first plurality of segments;
   display a second plurality of segments associated with the media content item, each of the segments having a successive respective start time and end time bounded by the start time and the end time associated with the media content item, wherein at least one of the segments in the second plurality of segments is different from one of the first plurality of segments;
   receive an indication of a selected segment from the second plurality of segments; and
   play a portion of the media content item corresponding to the selected segment.

2. The computing device of claim 1 wherein the media content item comprises a song including music and lyrics.

3. The computing device of claim 2 wherein at least one of the segments in the first and second plurality of segments comprises text associated with the lyrics of the song.

4. The computing device of claim 2 wherein at least one of the segments in the first and second plurality of segments comprises an element not associated with the lyrics of the song.

5. The computing device of claim 4 wherein the element comprises a special display character.

6. The computing device of claim 4 wherein the element comprises one of a music-only designation or a designation of a non-transcribable portion of the song.

7. The computing device of claim 1 wherein the indication of a selected segment from the second plurality of segments is received within an allowable period of time subsequent to the instruction to navigate through the first plurality of segments being received.

8. A computer-implemented method comprising:
   displaying a first plurality of segments associated with a media content item, each of the segments having a successive respective start time and end time bounded by a start time and an end time associated with the media content item;
   receiving an instruction to navigate through the first plurality of segments;
   displaying a second plurality of segments associated with the media content item, each of the segments having a successive respective start time and end time bounded by the start time and the end time associated with the media content item, wherein at least one of the segments in the second plurality of segments is different from one of the first plurality of segments;
   receiving an indication of a selected segment from the second plurality of segments; and
   playing a portion of the media content item corresponding to the selected segment.

9. The method of claim 8 wherein the media content item comprises a song including music and lyrics.

10. The method of claim 9 wherein at least one of the segments in the first and second plurality of segments comprises text associated with the lyrics of the song.

11. The method of claim 9 wherein at least one of the segments in the first and second plurality of segments comprises an element not associated with the lyrics of the song.

12. The method of claim 11 wherein the element comprises a special display character.

13. The method of claim 11 wherein the element comprises one of a music-only designation or a designation of a non-transcribable portion of the song.

14. The method of claim 8 wherein the indication of a selected segment from the second plurality of segments is received within an allowable period of time subsequent to the instruction to navigate through the first plurality of segments being received.

15. A non-transitory computer-readable storage medium including instructions that, when executed by at least one processor of a computing system, cause the computing system to:
   display a first plurality of segments associated with a media content item, each of the segments having a successive respective start time and end time bounded by a start time and an end time associated with the media content item;
   receive an instruction to navigate through the first plurality of segments;
   display a second plurality of segments associated with the media content item, each of the segments having a successive respective start time and end time bounded by the start time and the end time associated with the media content item, wherein at least one of the segments in the second plurality of segments is different from one of the first plurality of segments;
   receive an indication of a selected segment from the second plurality of segments; and
   play a portion of the media content item corresponding to the selected segment.

16. The non-transitory computer-readable storage medium of claim 15 wherein the media content item comprises a song including music and lyrics.

17. The non-transitory computer-readable storage medium of claim 16 wherein at least one of the segments of the first and second plurality of segments comprises text associated with the lyrics of the song.

18. The non-transitory computer-readable storage medium of claim 16 wherein at least one of the segments of the first and second plurality of segments comprises an element not associated with the lyrics of the song.

19. The non-transitory computer-readable storage medium of claim 18 wherein the element comprises a special display character.

20. The non-transitory computer-readable storage medium of claim 18 wherein the element comprises one of a music-only designation or a designation of a non-transcribable portion of the song.

21. The non-transitory computer-readable storage medium of claim 15 wherein the indication of a selected segment from the second plurality of segments is received within an allowable period of time subsequent to the instruction to navigate through the first plurality of segments being received.

* * * * *